United States Patent
Ellis et al.

[11] Patent Number: 5,826,904
[45] Date of Patent: Oct. 27, 1998

[54] DIRECTIONAL COMPRESSED GAS INFLATOR

[75] Inventors: Kelly D. Ellis, Roy; Daniel G. Minert, Clearfield; Davin G. Saderholm, Salt Lake City; Brian M. Shaklik, Fruit Heights, all of Utah

[73] Assignee: Morton International, Inc., Chicago, Ill.

[21] Appl. No.: 664,995

[22] Filed: Jun. 10, 1996

[51] Int. Cl.[6] .................................................. B60R 21/26
[52] U.S. Cl. ............................. 280/737; 280/740; 222/3
[58] Field of Search .................................. 280/737, 740, 280/736, 741, 742, 728.2, 730.2; 222/3, 5; 137/68.13

[56] References Cited

U.S. PATENT DOCUMENTS

| | | | |
|---|---|---|---|
| 3,460,853 | 8/1969 | Chute | 280/737 |
| 3,784,223 | 1/1974 | Hass et al. | 280/740 |
| 4,981,534 | 1/1991 | Scheffe | 280/741 |
| 5,016,914 | 5/1991 | Faigle et al. | 280/741 |
| 5,022,674 | 6/1991 | Frantom et al. | 280/737 |
| 5,131,680 | 7/1992 | Coultas et al. | 280/737 |
| 5,257,817 | 11/1993 | Cuevas | 280/736 |
| 5,263,740 | 11/1993 | Frey et al. | 280/737 |
| 5,454,586 | 10/1995 | Rogerson | 280/740 |
| 5,533,750 | 7/1996 | Karlow et al. | 280/728.2 |

FOREIGN PATENT DOCUMENTS

| | | | |
|---|---|---|---|
| 600598 | 6/1994 | European Pat. Off. | 280/740 |

*Primary Examiner*—Peter C. English
*Attorney, Agent, or Firm*—Henry W. Tarring, II; Gerald K. White

[57] ABSTRACT

A compressed gas inflator to be used in passive restraint airbag systems is disclosed. The inflator includes a manifold which discharges the inflation gas in the direction the airbag cushion is intended to inflate, resulting in less damage being inflicted on the airbag cushion during inflation and more consistent airbag inflation performance.

19 Claims, 2 Drawing Sheets

DIRECTIONAL COMPRESSED GAS INFLATOR

BACKGROUND OF THE INVENTION

1. Field of the Invention

The invention is directed to a compressed gas inflator having a directional discharge of gas for use in inflating inflatable items, such as the airbag cushions of automotive airbag passive restraint systems.

2. Description of Related Art

Airbag passive restraint systems, as are commonly found in modern vehicles, rely on inflators to provide a sufficient quantity of gas to rapidly inflate an airbag, or cushion, in response to a signal generated by a crash sensor located elsewhere on the vehicle. One form of prior art inflator comprises a pressurized fluid in a storage container which has a rapid-opening discharge means and an associated activation device which activates opening of the discharge means in response to the receipt of an electrical signal from a crash sensor.

An example of such a prior art inflator is illustrated in FIG. 1. The inflator 10 comprises an elongated housing 12 which includes a cylindrical side wall 14 extending between a first end closure 16 and a second end closure 18. The first end closure 16 includes a diffuser cap 20 and a rupture disc 22. The diffuser cap 20 includes a plurality of diffusion ports 24 evenly spaced around its periphery and a mount for an activation device 26, which typically is a squib, directly opposite the rupture disc 22. A storage chamber 28 for storing a pressurized fluid is defined by the side wall 14, a portion of the diffuser cap 20, the rupture disc 22 and the second end closure 18. A fill port 30 for charging the pressurized fluid to the storage chamber 28 extends through the second end closure 18. Typically, a folded airbag cushion is mounted along a side of the cylindrical side wall 14, with portions of the airbag, or flaps, extending around, and essentially enclosing, the housing. The pressurized fluid typically is a pressurized gas which may be stored as a compressed liquified gas. When a crash is detected by a crash sensor, it transmits an electrical signal to the activation device 26. If the activation device is a squib, it ignites and directs the ignition products at the rupture disc 22, causing the rupture disc to open. The pressurized fluid then forms an expanding volume of gas which flows through the diffuser cap 20 and the plurality of diffusion ports 24 and into the airbag cushion (not shown). The cushion then expands in a direction which is generally away from and perpendicular to the longitudinal axis of the inflator, as indicated by the arrow A.

In developing the illustrated prior art compressed gas inflator the inventors identified functional problems occurring during the inflation operation, such as occasional cushion damage, occasional structural damage to adjacent components and inconsistent opening performance. The present inventive compressed gas inflator has performed satisfactorily without encountering the operational problems of the prior art inflator.

SUMMARY OF THE INVENTION

The inventive inflator provides for directing the expanding gas to an exhaust manifold chamber which provides a more uniform and balanced distribution of the gas into the airbag cushion. The exhaust manifold chamber is located on one side of, and essentially parallel to, the elongated storage chamber. A plurality of diffusion ports arranged along the length of the exhaust manifold chamber provide the expanding gas to an associated airbag cushion in a manner which augments and directs the expansion of the airbag in its intended direction, while allowing the heated gases produced by the squib to be diluted and cooled prior to their contacting the fabric or sheet material of the airbag cushion.

DETAILED DESCRIPTION OF THE INVENTION

Figure 2:
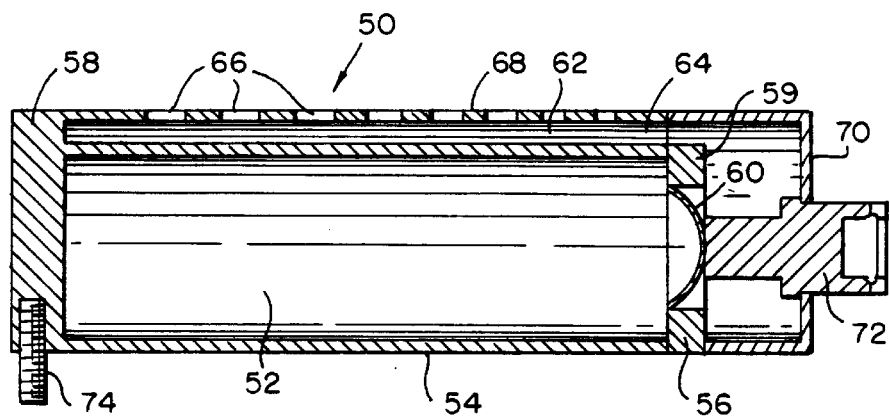
FIG. 2 is a sectional side view, as indicated by the section arrows 2—2 in FIG. 4, of an inflator according to the present invention.
Figure 3:
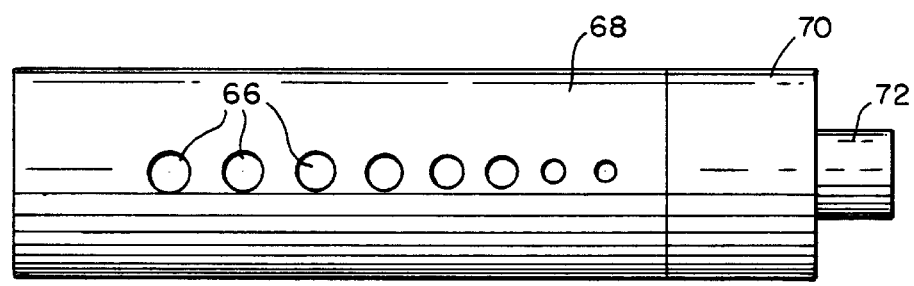
FIG. 3 is a top view of the inflator illustrated in FIG. 2.
Figure 4:
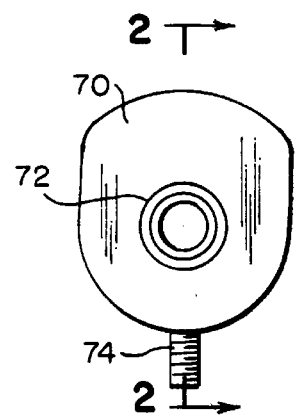
FIG. 4 is an end view of the inflator illustrated in FIG. 2.

FIGS. 2 through 4 illustrate a preferred embodiment of an inflator according to the present invention. The inflator 50 comprises a single elongated fluid storage chamber 52, which is defined by a generally cylindrical side wall 54 extending between a first end closure 56 and a second end closure 58. The first end closure includes a weld ring 59 and an openable discharge means, such as rupture disc 60. An exhaust manifold chamber 62 extends along one side of the side wall 54 of the storage chamber 52. The exhaust manifold chamber 62 is open at its first end 64, located adjacent the first end closure 56 of the storage chamber 52. A plurality of exhaust ports 66 extend along the longitudinal length of the exterior wall 68 of the exhaust manifold chamber 62. A cap 70 at one end of inflator 50 encloses both the open first end 64 of the exhaust manifold chamber 62 and the side of the openable discharge means 60 which is opposite the storage chamber 52. The cap 70 provides a mount for an initiator means 72, which is capable of initiating opening of the discharge means 60 in response to a signal transmitted from an external source, such as a crash sensor mounted at an appropriate location elsewhere on the vehicle. The initiator means typically is a squib which ignites a pyrotechnic material with a spark or hot spot triggered by an electrical impulse or signal received from the crash sensor. The squib is mounted on the cap 70 so that the ignition products it creates will be directed against the rupture disc 60 to cause it to open. The second end closure 58 encloses both the second end of the storage chamber 52 and the second end of the exhaust manifold chamber 62. A mounting bolt or pin 74 for mounting the initiator to either an airbag passive restraint system housing or a mounting structure on another component of the vehicle can be attached to the second end closure 58. A fill port (not shown) for filling the storage chamber 52 with a pressurized gas can also be provided in the second end closure 58. If desired, an optional adhesive backed thin metal foil (not shown) can be provided extending over the plurality of exhaust ports 66 to seal the inflator from dust and insects. The foil should be sufficiently thin that the release of pressurized fluid during activation of the inflator causes the foil to burst open.

Openable discharge means 60 other than the rupture disc illustrated can be used. For instance, such means can be formed as a weakened section of the weld ring by providing breakage indentations in the surface of the weld ring. Other openable structures, such as valves or releasable plugs, could also be used, provided they do not permit excessive leakage of the pressurized gas, open sufficiently rapidly to permit inflation of the airbag cushion within its required parameters, and do not introduce unattached solid matter capable of being entrained in the flow of gas.

The choice of initiator means to be used depends on the particular form of openable discharge means selected. When the openable discharge means includes a rupture disc or similar rupturable structure, a squib, or a device which propels a ram or hammer to strike the rupturable area in response to an electrical signal can be effective initiators. When the openable discharge means involves a releasable plug, the initiator means could rely on an explosive bolt or pin to release the plug.

The inflator is assembled by attaching, typically by welding, the rupture disc 60 to the weld ring 59 to form the first end closure 56. The rupture disc is fabricated from Inconel, an alloy of nickel, chromium and iron, or stainless steel sheet material having a thickness in the range of 0.010–0.020 inches, and, preferably, about 0.012 inches. The remainder of the inflator is typically fabricated from steel. The storage chamber 52, exhaust manifold chamber 62, and second end closure 58 preferably are formed as a unitary body by a deep drawing or stamping operation. The exhaust ports 66 are then provided in the unitary body by a machining or stamping operation. This sub-assembly can also be fabricated by attaching an end closure plate 58 to the adjoining end of the generally cylindrical side wall 54 of the storage chamber 52 and then attaching the exterior wall 68 of the exhaust manifold chamber 62 to the assembled end closure plate and side wall. The first end closure 56 is then attached, typically by a laser weld, to the adjoining end of the side wall 54 of the storage chamber 52. The initiator 72 is attached in cap 70, typically by being pressed into a mounting hole, and the cap is attached to the ends of the side wall 54 and the exterior wall 68, typically by a laser weld. A pressurized fluid is then added to the storage chamber through a fill port (not shown) located in the second end closure 58. The pressurized fluid can be a gas or a liquefied compressed gas which is a gas at ambient conditions but is liquified, in whole or in part, at the conditions at which it is stored. Pressurized inert gases, such as nitrogen, or noble gases, such as helium, argon and xenon, may be stored in the storage chamber 52 at pressures in the range of 1000 to 9000 psi. Preferably, argon is provided in the storage chamber 52 at a pressure in the range of 3000 to 5000 psig, and most preferably, at a pressure of about 3500 to 4500 psig. A minor amount of helium may be provided in mixture with the argon for its ready detectability during leak testing of the chamber. During the gas filling and any subsequent operations, the inflator should be firmly mounted or restrained and/or shielded, since accidental opening of the discharge means 60 could result in a directional discharge of the stored gas, accompanied by an equal and opposite reactive force tending to propel the inflator in the direction opposite the directional discharge. Accordingly, during manufacturing and shipping of the inflator, appropriate mounting and/or shielding should be provided whenever a possibility that an accidental opening of the discharge means 60 could occur.

The basic configuration of the inventive inflator can be provided from other configurations of the component parts. For instance the side wall 54 and the second end of the storage chamber 52 can be provided as a first unitary piece and the cap 70, exterior wall 68 of the exhaust manifold chamber 62 and the portion of the second end closure which serves to seal that end of the exhaust manifold chamber can be provided as a second unitary piece. The inflator could then be assembled by welding the first end closure, comprising weld ring 59 and rupture disc 60, to the first unitary piece to form a first sub-assembly, installing the initiator 72 in the second unitary piece to form a second sub-assembly, welding the first sub-assembly to the second sub-assembly and then filling the storage chamber 52 with pressurized fluid.

The inventive inflator is particularly suited for use with some of the smaller capacity airbag systems, such as side impact systems, wherein the cushion deploys between the vehicle occupant and the side of the passenger compartment. Often such deployment is between the driver's side and the driver's door and its associated window. In such an application the inflator and its associated airbag cushion could be mounted in the door, a side panel of the passenger compartment or, as preferred, to the rear of the driver's seat. The inflator should be mounted to a relatively strong and rigidly fixed structural member in view of the directionality of its gas discharge and the equal and opposite reaction which accompanies such. The mounting bolt or pin 74 and a screw connection provided on the external portion of the squib provide two sturdy mounting posts for attaching the inflator to a suitable mount.

Figure 5:
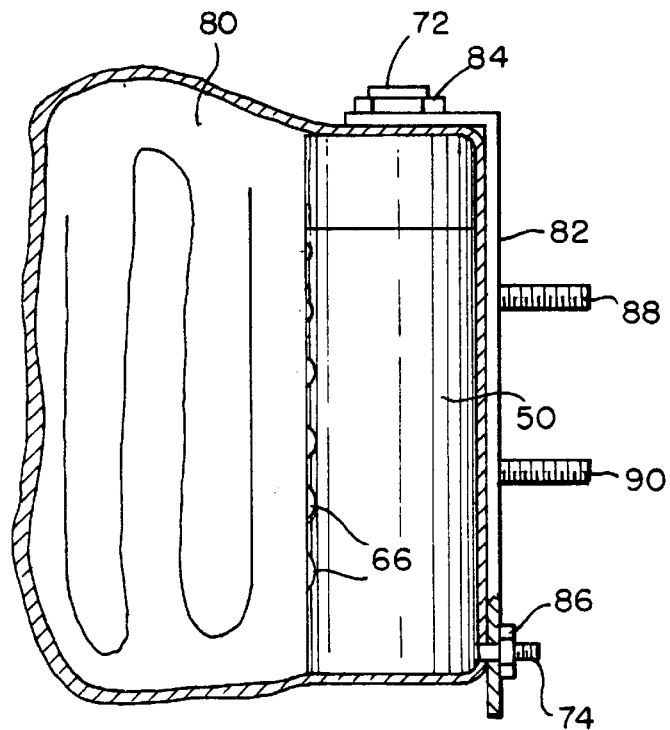
FIG. 5 is a side view, partially in section, of a side impact airbag assembly which uses an inflator like that illustrated in FIG. 2.

FIG. 5 illustrates a side impact airbag passive restraint system using the inventive inflator. In this system, the inflator 50 is sewn into a first end of the sleeve forming the airbag cushion 80 with only the mounting bolt 74 and an externally threaded portion of the squib initiator 72 extending through holes provided therefor in the airbag cushion. The exhaust ports 66 of the inflator are located so that they discharge the inflation gas into a second closed end of the sleeve forming the airbag cushion in the direction the cushion is intended to open, or expand, from its folded condition. A module attachment bracket 82 is provided to mount the airbag assembly to the seat frame (not shown). The inflator 50 and the airbag cushion 80 are mounted on the module attachment bracket 82 by placing the threaded extreme outer portion of the squib 72 and the mounting bolt 74 through holes provided in the bracket and affixing them thereto by attachment nuts 84 and 86. The assembly can then be installed to the seat frame (not shown) by affixing studs 88 and 90 to mounting locations provided on the seat frame.

Operation of the inflator begins when a crash sensor initiates an electrical signal in response to a sensed condition which usually accompanies a collision, such as a sudden extreme deceleration. The electrical signal is conducted to the initiator/squib 72 within which it creates a hot spot or spark which ignites an adjacently positioned pyrotechnic material. The burst of ignition products, and the pressure wave, or shock, created thereby, is directed at the openable discharge means, or rupture disc 60, which is thereby caused to burst open. The pressure on the pressurized fluid is released when the rupture disc opens allowing the fluid to form an expanding gas volume which exits the chamber through the opened rupture disc, is restrained by the cap 70 and guided into the exhaust manifold chamber 62 through its open end 64. The expanding gas volume is then directed out of the inflator and into the associated airbag cushion through the plurality of exhaust ports 66 extending along the length of the exhaust manifold chamber 62.

As best illustrated in FIG. 3, preferably each of the exhaust ports is provided with an increasing cross-sectional area as the distance of each of said ports from the open end 64 of the exhaust manifold chamber 62 increases, in order to equalize the mass flow rate of the expanding gas through each of the exhaust ports. The folded airbag is mounted with its open, gas receiving end overlying the exhaust ports and its intended direction of expansion extending outward from the outer surface of the exterior wall 68 in which the exhaust ports are located. Accordingly, the flow of the expanding gas, as it exits the exhaust ports and enters the airbag cushion, is directed in the same direction as the intended direction of airbag cushion expansion.

Figure 1:
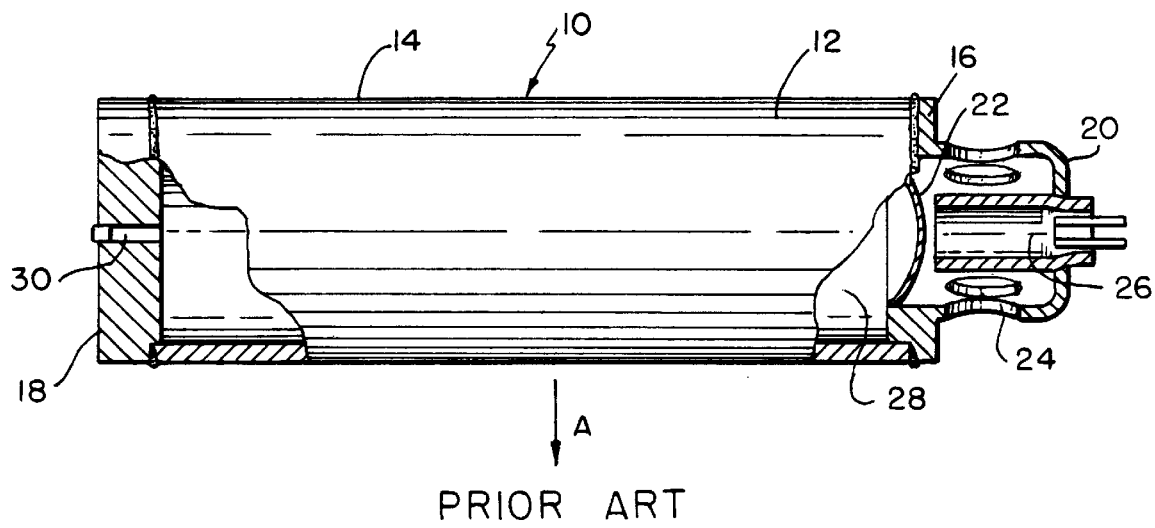
FIG. 1 is a side view, partially in section, of a prior art compressed gas inflator.

In contrast, the prior art inflator of FIG. 1 discharged its expanding gases through the diffuser ports 24 arranged around the periphery of cap 20, resulting in some of the gases being directed in the opposite direction to the intended expansion direction of the airbag cushion. Moreover, while compressed gas inflators provide inflation gas which is relatively cold compared to inflators which develop gases from azide and other rapidly oxidized compounds, the prior art inflator would occasionally burn, or singe, the airbag cushion in the vicinity of the diffuser ports 24 and, occasionally, would damage, other vehicle components located in the vicinity of the diffuser ports. The inventors found that this was related to the proximity of the airbag cushion to the squib, whereby the ignition products produced by the squib were not adequately cooled by the time they encountered the airbag cushion. As a result of these factors, the prior art inflators were prone to damaging the airbag cushion during its deployment, often resulting in holes in the fabric, which, in turn, allowed uncontrolled leakage of the inflation gas and slow or incomplete deployment of the cushion. The inflator illustrated in FIGS. 2 through 4 has functioned satisfactorily without encountering the problems of the prior art inflator of FIG. 1.

The foregoing is intended to provide a full, clear, concise and exact description of the inventive inflator and of how it is made and used. The scope of the invention is not intended to be limited to the specific embodiments illustrated and described. The scope of the invention should be determined from the scope of the inflators defined by the following claims and equivalents thereto.

We claim:

1. An inflator suitable for use in a passive restraint airbag system, comprising:
   (a) an elongated storage chamber for pressurized fluid extending between a first end and a second end and having an openable discharge means at said first end;
   (b) an exhaust manifold chamber extending along a single side of said storage chamber between said first end and said second end and having an open first end located adjacent said first end of said storage chamber;
   (c) a cap structure enclosing both the first end of said storage chamber and the open first end of said exhaust manifold chamber;
   (d) an initiator means operable to open said discharge means, and
   (e) a plurality of exhaust ports located along the longitudinal extension of said exhaust manifold chamber.

2. The inflator of claim 1, wherein:
said openable discharge means comprises a rupture disc.

3. The inflator of claim 2 wherein:
said initiator means is mounted on said cap structure.

4. The inflator of claim 3 wherein:
said initiator means comprises an electrically activated squib.

5. The inflator of claim 4, wherein said squib is the only electrically activated component in the inflator.

6. The inflator of claim 1 wherein:
the cross-sectional area of each of said plurality of exhaust ports increases as the distance of each of said plurality of ports from said open first end increases.

7. The inflator of claim 1, further comprising:
a pressurized fluid in said storage chamber.

8. The inflator of claim 7, wherein:
said pressurized fluid comprises at least one pressurized gas selected from the group consisting of nitrogen, helium, argon and xenon.

9. The inflator of claim 7, wherein:
said pressurized fluid comprises at least a major amount of argon.

10. The inflator of claim 7, wherein:
said pressurized fluid comprises a minor amount of helium.

11. The inflator of claim 7, wherein said pressurized fluid is at a pressure in the range of 1000 to 9000 psi.

12. The inflator of claim 11, wherein said pressurized fluid is at a pressure in the range of 3000 to 5000 psi.

13. The inflator of claim 1, wherein:
said storage chamber includes a side wall extending between said first end and said second end, said exhaust manifold chamber includes an exterior wall extending along said single side of said storage chamber, and said side wall and said exterior wall are formed as a unitary structure.

14. The inflator of claim 13, wherein:
said unitary structure comprising said side wall and said exterior wall is a unitary deep drawn structure.

15. The inflator of claim 13, wherein
an end closure closes said second end of said storage chamber and an end of said exhaust manifold chamber adjacent to said second end, and said end closure, said side wall and said exterior wall are formed as a unitary structure.

16. An airbag passive restraint system, comprising:
an airbag cushion, and
the inflator defined in claim 1.

17. The airbag passive restraint system of claim 16, wherein:
said inflator is mounted inside said airbag cushion.

18. The airbag passive restraint system of claim 14, wherein:
said storage chamber contains pressurized fluid capable of providing sufficient inflation gas to inflate said cushion when said discharge means is opened, and said inflator is mounted at one end of said airbag cushion with said plurality of exhaust ports located to direct the inflation gas in the airbag cushion in the direction in which the cushion is intended to expand.

19. The airbag passive restraint system of claim 16, wherein:
said airbag cushion comprises a sleeve having a first end and a second closed end, and said inflator is mounted at said first end of said sleeve with said plurality of exhaust ports located to direct gas produced by the pressurized fluid when the inflator is activated toward the second closed end of said sleeve.

\* \* \* \* \*